US012804424B2

(12) United States Patent
Jiang

(10) Patent No.: US 12,804,424 B2
(45) Date of Patent: Nov. 17, 2026

(54) METHOD FOR REPORTING INFORMATION USING TIMING INFORMATION, TERMINAL, NETWORK, DEVICE, AND STORAGE MEDIUM

(71) Applicant: Beijing Xiaomi Mobile Software Co., Ltd.

(72) Inventor: Xiaowei Jiang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 255 days.

(21) Appl. No.: 18/724,154

(22) PCT Filed: Dec. 28, 2021

(86) PCT No.: PCT/CN2021/142228

§ 371 (c)(1),
(2) Date: Jun. 25, 2024

(87) PCT Pub. No.: WO2023/123002

PCT Pub. Date: Jul. 6, 2023

(65) Prior Publication Data

US 2025/0063385 A1 Feb. 20, 2025

(51) Int. Cl.
*H04W 24/02* (2009.01)
*H04W 24/10* (2009.01)

(52) U.S. Cl.
CPC ........... *H04W 24/02* (2013.01); *H04W 24/10* (2013.01)

(58) Field of Classification Search
CPC ..... H04W 24/00; H04W 24/02; H04W 24/04; H04W 24/10; H04W 28/12; H04W 84/06; H04L 47/28; H04L 47/283; H04B 7/185; H04B 7/18502; H04B 7/18504; H04B 7/1851
See application file for complete search history.

(56) References Cited

U.S. PATENT DOCUMENTS

| | | | |
|---|---|---|---|
| 2006/0239285 A1 | 10/2006 | Nomura et al. | |
| 2016/0037511 A1 | 2/2016 | Vincze et al. | |
| 2017/0289946 A1 | 10/2017 | Aldana | |
| 2019/0159147 A1 | 5/2019 | Ryu et al. | |
| 2021/0036762 A1 | 2/2021 | Abedini et al. | |
| 2023/0164721 A1 * | 5/2023 | Tsai .................. | H04W 56/0005 370/350 |

(Continued)

FOREIGN PATENT DOCUMENTS

| | | |
|---|---|---|
| CN | 103650413 A | 3/2014 |
| CN | 103843437 A | 6/2014 |

(Continued)

OTHER PUBLICATIONS

Nokia, Nokia Shanghai Bell; "Remaining time and frequency synchronization aspects for NR over NTN"; 3GPP TSG RAN WG1 #107 R1-2110900 e-Meeting, Nov. 11-19, 2021, pp. 1-29. (Year: 2021).*

(Continued)

*Primary Examiner* — Robert C Scheibel
(74) *Attorney, Agent, or Firm* — McCoy Russell LLP

(57) ABSTRACT

A method for reporting information includes: sending, by a terminal, timing information to a network device, the timing information indicating a valid duration of RTT information, and the RTT information indicating a duration from the terminal to the network device via a transit device.

20 Claims, 5 Drawing Sheets

(56) References Cited

U.S. PATENT DOCUMENTS

| | | | | |
|---|---|---|---|---|
| 2024/0224207 | A1* | 7/2024 | Zhang | H04W 56/0015 |
| 2024/0292347 | A1* | 8/2024 | Manolakis | H04B 7/18513 |
| 2024/0340074 | A1* | 10/2024 | Yan | H04W 56/0005 |
| 2024/0364416 | A1* | 10/2024 | Medeiros De Amorim | H04B 7/18563 |
| 2024/0397462 | A1* | 11/2024 | Yoshioka | H04W 16/26 |
| 2024/0414672 | A1* | 12/2024 | Yuan | H04B 7/18513 |

FOREIGN PATENT DOCUMENTS

| | | | |
|---|---|---|---|
| CN | 108235384 | A | 6/2018 |
| CN | 110839248 | A | 2/2020 |
| CN | 111565427 | A | 8/2020 |
| CN | 112368954 | A | 2/2021 |
| CN | 112398587 | A | 2/2021 |
| CN | 113347697 | A | 9/2021 |
| CN | 113498153 | A | 10/2021 |
| CN | 113660158 | A | 11/2021 |
| KR | 1020210112366 | A | 9/2021 |
| WO | 2015172363 | A1 | 11/2015 |
| WO | 2020082017 | A1 | 4/2020 |
| WO | 2020164124 | A1 | 8/2020 |
| WO | 2021051286 | A1 | 3/2021 |
| WO | 2021072705 | A1 | 4/2021 |
| WO | 2021164579 | A1 | 8/2021 |
| WO | 2021196946 | A1 | 10/2021 |
| WO | 2021232434 | A1 | 11/2021 |

OTHER PUBLICATIONS

NEC; "Discussion on UL time synchronization for NR NTN"; 3GPP TSG RAN WG1 #107-e R1-2111178 e-Meeting, Nov. 11-19, 2021, pp. 1-6. (Year: 2021).*

NTT Docomo, Inc.; "Discussion on UL time and frequency synchronization enhancements for NTN"; 3GPP TSG RAN WG1 #107-e R1-2112105 e-Meeting, Nov. 11-Oct. 19, 2021; pp. 1-19. (Year: 2021).*

"Correction to HARQ RTT," Proceedings of the 3GPP TSG-RAN2 Meeting #95, HTC, R2-164924, Aug. 22, 2016, Gothenburg, Sweden, 4 pages.

"CR TS 32.455 Roud Trip Time KPI on S1-U Definition," Proceedings of the 3GPP TSG-SA5 Meeting #115, Telecom Italia, S5-175061, May 16, 2017, Busan, South Korea, 5 pages.

Yang, Y. et al., "Research and Practice on Mobile Network Delay Optimization Based on TCP," Telecommunications Technology, vol. 8, No. 10, Oct. 2018, 6 pages. (Submitted with English Abstract).

"Discussion on LS on TA pre-compensation," Proceedings of the 3GPP TSG RAN WG1 #105-e, ZTE, R1-2105198, May 10, 2021, e-Meeting, 6 pages.

"LTE; Evolved Universal Terrestrial Radio Access (E-UTRA); Medium Access Control (MAC) protocol specification," 3GPP TS 36.321, Version 15.10.0, Release 15, Nov. 2020, 137 pages.

* cited by examiner

METHOD FOR REPORTING INFORMATION USING TIMING INFORMATION, TERMINAL, NETWORK, DEVICE, AND STORAGE MEDIUM

CROSS-REFERENCE TO RELATED APPLICATIONS

The present application is a U.S. National Stage of International Application No. PCT/CN2021/142228, filed on Dec. 28, 2021, the contents of all of which are incorporated herein by reference in their entireties for all purposes.

BACKGROUND OF THE INVENTION

In a mobile communication technology, a terminal may communicate with a network device via a satellite. However, there is a round trip time (RTT) between the terminal and the network device. The network device may send system information to the terminal so as to indicate RTT information for determining the RTT, and the terminal may determine the RTT between the terminal and the network device according to the received RTT information.

SUMMARY OF THE INVENTION

The disclosure relates to the field of mobile communications, in particular to a method and an apparatus for reporting information, a device, and a storage medium.

According to an aspect of the disclosure, a method for reporting information is provided, performed by a terminal, and includes:

sending timing information to a network device, the timing information indicating a valid duration of RTT information, and the RTT information indicating a duration from the terminal to the network device via a transit device.

According to an aspect of the disclosure, a method for reporting information is provided, performed by a network device, and includes:

receiving timing information sent by a terminal, the timing information indicating a valid duration of round trip time (RTT) information, and the RTT information indicating a duration from the terminal to the network device via a transit device.

According to an aspect of the disclosure, a terminal is provided, and includes: a processor; a transceiver connected with the processor; and a memory for storing executable instructions of the processor, where the processor is configured to load and execute the executable instructions so as to implement the method for reporting information as described in the above aspects.

According to an aspect of the disclosure, a network device is provided, and includes: a processor; a transceiver connected with the processor; and a memory for storing executable instructions of the processor, where the processor is configured to load and execute the executable instructions so as to implement the method for reporting information as described in the above aspects.

According to an aspect of the disclosure, a non-transitory computer readable storage medium is provided, the readable storage medium stores executable program codes, and the executable program codes are loaded and executed by a processor so as to implement the method for reporting information as described in the above aspects.

According to an aspect of the disclosure, a chip is provided, the chip includes a programmable logic circuit and/or program instructions, and the chip, when running on a terminal or a network device, is configured to implement the method for reporting information as described in the above aspects.

According to an aspect of the disclosure, a computer program product is provided, and the computer program product, when executed by a processor of a terminal or a network device, is configured to implement the method for reporting information as described in the above aspects.

BRIEF DESCRIPTION OF DRAWINGS

To describe technical solutions in examples of the disclosure more clearly, the following briefly introduces accompanying drawings needed for describing the examples. Apparently, the accompanying drawings in the following description show merely some examples of the disclosure, and those ordinarily skilled in the art may still derive other accompanying drawings from these accompanying drawings without creative efforts.

DETAILED DESCRIPTION OF THE INVENTION

Figure 1:
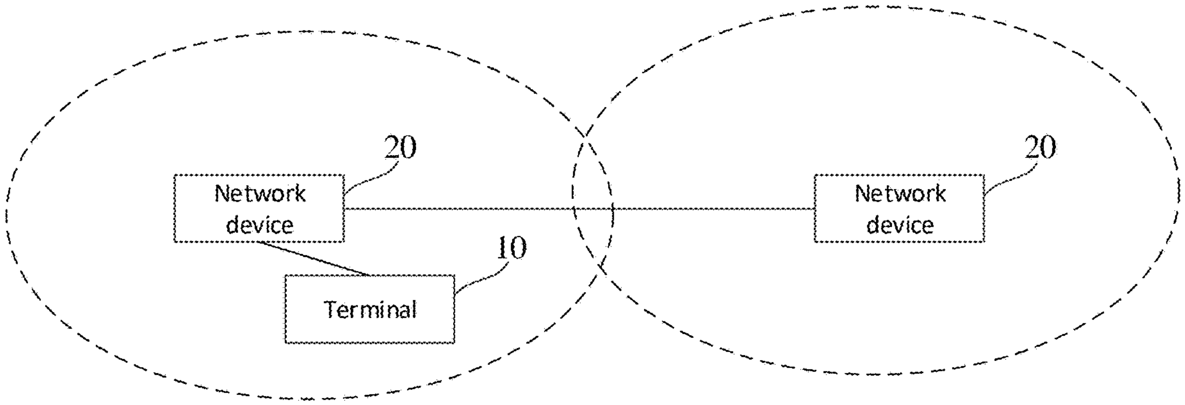
FIG. 1 shows a block diagram of a communication system provided by an example of the disclosure.

In order to make the objective, technical solutions and advantages of the disclosure clear, the implementations of the disclosure will be described further in detail below with reference to accompanying drawings.

Examples will be illustrated in detail here, and instances of which are represented in the accompanying drawings. When the following description refers to the accompanying drawings, the same number in the different accompanying drawings represents the same or similar elements unless otherwise indicated. The implementations described in the following examples do not represent all implementations consistent with the disclosure. On the contrary, they are merely examples of an apparatus and method consistent with some aspects of the disclosure as detailed in the appended claims.

Terms used in the disclosure are merely for the purpose of describing the particular examples, and are not intended to limit the disclosure. The singular forms "a", "the" and "this" used in the disclosure and the appended claims are also intended to include the plural forms, unless the context clearly indicates otherwise. It is to be further understood that a term "and/or" used in this text refers to and contains any or all possible combinations of one or more associated listed items.

It is to be understood that terms "first", "second", "third" and the like may be employed in the disclosure to describe various information, but these pieces of information should not be limited to these terms. These terms are merely used to distinguish the same type of information from one another. For example, in a case of not departing from the scope of the disclosure, first information may also be called second information, and similarly, the second information may also be called the first information. Depending on the context, for example, the word "if" as used here may be interpreted as "at the time of" or "when" or "in response to determining".

Since the RTT information corresponds to a valid duration, and the RTT information is valid within the valid duration, the terminal starts to count the valid duration of the RTT information by taking an ending moment of a window corresponding to the system information as a starting moment (namely, an epoch time) from which the RTT information is valid. However, the network device cannot determine the starting moment of the RTT information received by the terminal, which causes that data cannot be transmitted normally.

Examples of the disclosure provide a method and an apparatus for reporting information, a device, and a storage medium, so as to facilitate a network device in determining a starting moment of a valid duration of RTT information received by a terminal, and ensuring accuracy of information reported by the terminal.

An example of the disclosure provides an information reporting manner, and the terminal reports the timing information of the RTT information to the network device, so as to facilitate the network device in determining the starting moment of the valid duration of the RTT information received by the terminal, and ensuring accuracy of the information reported by the terminal. Additionally, the timing information can indicate the valid duration of the RTT information to the network device, so as to facilitate the network device in executing subsequent data transmission based on the timing information, and ensuring the reliability of data transmission.

The following describes an application scenario of the disclosure.

FIG. 1 shows a block diagram of a communication system provided by an example of the disclosure. The communication system may include: a terminal 10 and a network device 20.

The number of the terminals 10 is generally multiple, and one or more terminals 10 may be distributed in a cell managed by each network device 20. The terminal 10 may include various handheld devices, vehicle-mounted devices, wearable devices and computing devices with wireless communication functions, or other processing devices connected to a wireless modem, as well as various forms of user equipment (UE), mobile stations (MS), and so on. For the convenience of description, the devices mentioned above are collectively referred to as the terminal in the example of the disclosure.

The network device 20 is an apparatus deployed in an access network to provide a wireless communication function for the terminal 10. The network device 20 may include various forms of macro base stations, micro base stations, relay stations, access points and the like. In systems using different wireless access technologies, names of devices with network device functions may be different. For example, in a 5G new radio (NR) system, the device is called gNodeB or gNB. With evolution of a communication technology, the name "network device" may be changed. To facilitate the description, the above apparatuses that provide the wireless communication function for the terminal 10 are collectively referred to as the network device in the example of the disclosure. A connection may be established between the network device 20 and the terminal 10 through an air interface, so as to perform communication through the connection, including interaction of a signaling and data. The number of the network devices 20 may be multiple, and two adjacent network devices 20 may also communicate with each other in a wired or wireless manner. The terminal 10 may perform switching between the different network devices 20, that is, establish a connection with the different network devices 20.

Figure 2:
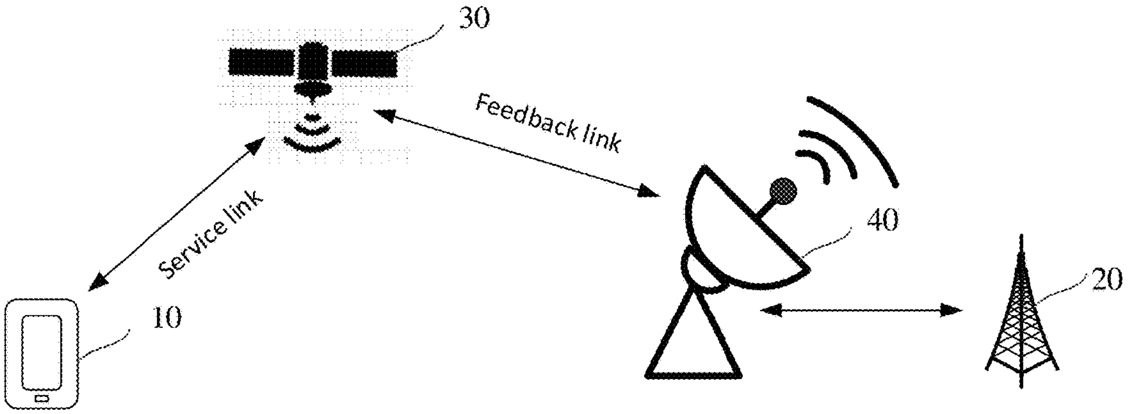
FIG. 2 shows a schematic diagram of signal processing provided by an example of the disclosure.

FIG. 2 shows a schematic diagram of signal processing provided by an example of the disclosure. In FIG. 2, the communication system may further include a transit device 30. If the network device 20 needs to send a signal to the terminal 10, the network device first sends the signal to the transit device 30, and then the transit device 30 forwards the received signal to the terminal 10.

In some examples, the transit device 30 may be a satellite, an unmanned aerial vehicle, or other devices having a transit function, which is not limited in the example of the disclosure.

FIG. 2, the transit device 30 is the satellite, the communication system further includes a ground station 40, and the ground station 40 performs wireless communication with the transit device 30 and the network device 20 respectively.

In some examples, the transit device 30 may use two transit modes, a transparent payload mode and a regenerative payload mode, respectively.

For example, if the transit mode of the transit device 30 is the transparent payload mode, after the network device 20 sends the signal to the transit device 30, the transit device 30 converts the frequency of the signal and then sends the signal to the terminal 10 without demodulating the signal.

For another example, if the transit mode of the transit device 30 is the regenerative payload mode, after the network device sends the signal to the transit device 30, the transit device 30 first demodulates the received signal, then encodes and modulates the signal again to obtain a regenerated signal, and sends the regenerated signal to the terminal 10.

In the example of the disclosure, transmission needs to be performed between the terminal 10 and the network device 20 via the transit device 30, while transmission between the terminal 10 and the network device 20 via the transit device 30 needs to consume a duration, and the duration is an RTT. For the RTT, the RTT includes two parts: a duration from the terminal 10 to the transit device 30 and a duration from the transit device 30 to the network device 20, respectively.

In some examples, the network device 20 sends RTT information to the terminal 10, and the RTT information indicates the RTT from the terminal 10 to the network device 20 via the transit device 30.

In some examples, the network device 20 sends the RTT information through system information.

In some examples, the RTT information includes first information and second information. The first information indicates the RTT from the transit device 30 to the network device 20, and the second information indicates an RTT from the terminal 10 to the transit device 30.

After acquiring the second information, the terminal 10 may determine a location of the transit device 30 according to the second information, and may calculate and determine the RTT from the terminal 10 to the transit device 30.

For example, the first information is common timing advance (TA), and the second information is ephemeris information.

The RTT information further has a valid duration, and the RTT information is valid within the valid duration of the RTT information.

In some examples, the valid duration is represented by a timing duration of a timer.

For example, the timer is a validity timer, or another timer, which is not limited in the example of the disclosure.

In the examples of the disclosure, the system information may further indicate a starting moment of the valid duration of the RTT information in an implicit indication manner, and the implicit indication manner is to take an ending moment of a time window for sending the RTT information as the starting moment of the valid duration of the RTT information. That is to say, the system information sent to the terminal by the network device implicitly indicates the starting moment of the valid duration of the RTT information, and specifically, the network device may take an ending location of a system information window (SI window) of the system information containing the ephemeris information and the common TA information as an epoch time (namely, a validity starting moment).

If the valid duration is represented by the timing duration of the timer, the ending moment of the window for sending the RTT information is taken as a starting moment of the timer.

In some examples, the terminal in the above examples is an Internet of Things (IOT) terminal, and the IOT device is a bandwidth reduction and low complexity UE (BL UE), a UE in a coverage enhancement (CE) mode, and a narrow band Internet of Things (NB-IOT) UE.

The "5G NR system" in the examples of the disclosure may also be referred to as a 5G system or an NR system, but a person skilled in the art may understand its meaning. The technical solutions described in the examples of the disclosure may be applicable to the 5G NR system, and may also be applicable to a subsequent evolution system of the 5G NR system.

Figure 3:
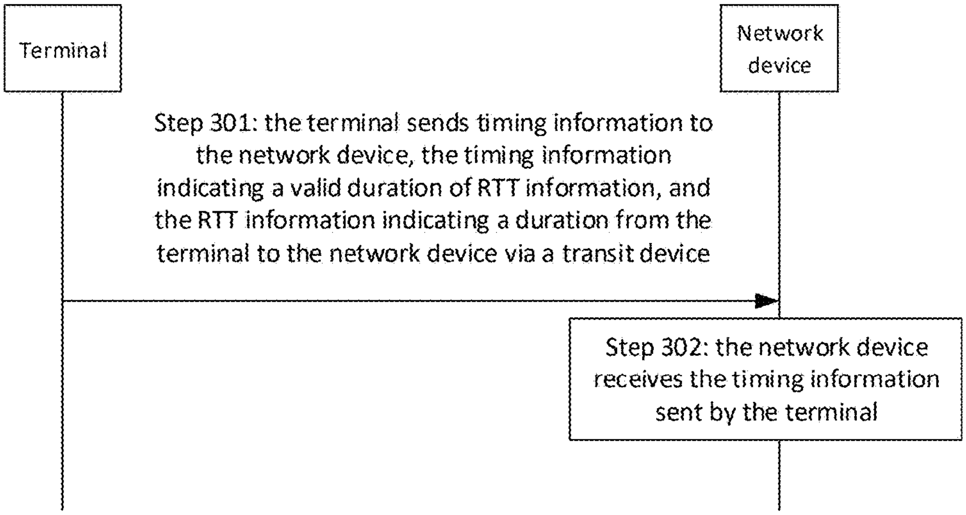
FIG. 3 shows a flow diagram of a method for reporting information provided by an example of the disclosure.

FIG. 3 shows a flow diagram of a method for reporting information provided by an example of the disclosure, which is for example, may be applied to a terminal and a network device as shown in FIG. 2. The method includes at least some of the following contents:

Step 301: the terminal sends timing information to the network device, the timing information indicating a valid duration of RTT information, and the RTT information indicating a duration from the terminal to the network device via a transit device.

Step 302: the network device receives the timing information sent by the terminal.

In the example of the disclosure, the terminal actively sends the timing information to the network device, and informs the network device of the valid duration of the RTT information through the timing information; and after receiving the timing information, the network device may determine the valid duration of the RTT information indicated by the timing information.

After determining the valid duration of the RTT information of the terminal according to the timing information, the network device may reconfigure the RTT information for the terminal before the valid duration of the RTT information expires, so that the terminal continues to perform uplink transmission.

In the example of the disclosure, the network device carries the RTT information in system information, and broadcasts the system information; after receiving the RTT information, the terminal may determine the RTT information; and the system information further includes the valid duration of the RTT information, and the terminal determines the valid duration of the RTT information according to the system information.

In addition, the network device may further complete scheduling and release the terminal before the valid duration of the RTT information expires. In some examples, the terminal may be an IOT terminal.

In some examples, the timing information includes at least one of: a remaining duration within the valid duration, a duration that has lasted within the valid duration; or the valid duration.

(1) a Remaining Duration within the Valid Duration.

In the example of the disclosure, the terminal reports the timing information of the RTT information to the network device. When the terminal reports the timing information, the valid duration of the RTT information may have passed a certain duration. Thus, the timing information includes the remaining duration within the valid duration, so that the network device determines the remaining duration within the valid duration of the RTT information.

In some examples, the remaining duration within the valid duration may be seconds, milliseconds, the number of frames, the number of subframes, the number of time slots, or other numeric values.

If the valid duration is a non-integer, the remaining duration within the valid duration is rounded off, and the rounded-off duration is taken as the remaining duration within the valid duration. For example, during reporting, the duration may be rounded off by using a floor manner (a round down manner), and if the duration is 5.8 seconds, 5 seconds is reported.

In some other examples, the remaining duration within the valid duration may be represented as a combination of the seconds and the number of frames, or a combination of the seconds and the number of subframes, or a combination of the seconds and the number of time slots.

The integer part of the remaining duration within the valid duration is represented in seconds, and the non-integer part is represented in the number of frames, the number of subframes or the number of time slots.

It is to be noted that if a timer is used to represent the valid duration of the RTT information in the disclosure, the remaining duration within the valid duration is a remaining duration from the timer expires.

(2) a Duration that has Lasted within the Valid Duration.

In the example of the disclosure, the terminal reports the timing information of the RTT information to the network device. When the terminal reports the timing information, the valid duration of the RTT information may have passed a certain duration. Thus, the timing information includes the duration that has lasted within the valid duration, so that the network device determines the remaining duration within the valid duration of the RTT information according to a difference value between the configured valid duration and the duration that has lasted within the valid duration.

In some examples, the duration that has lasted within the valid duration may be seconds, milliseconds, the number of frames, the number of subframes, the number of time slots, or other numeric values.

In some other examples, the duration that has lasted within the valid duration may be represented as a combination of the seconds and the number of frames, or a combination of the seconds and the number of subframes, or a combination of the seconds and the number of time slots.

It is to be noted that if a timer is used to represent the valid duration of the RTT information in the disclosure, the duration that has lasted within the valid duration is a duration timed after the timer is started.

(3) the Valid Duration.

In the example of the disclosure, the terminal further reports the valid duration of the RTT information to the network device, so that the network device determines the valid duration of the RTT information used by the terminal, thus ensuring that the network device may determine the remaining duration of the RTT information based on the valid duration, and improving accuracy of the timing information reported by the terminal. By reporting the valid duration of the RTT information, it may be avoided that when the configured valid duration of the RTT information is changed in a network, the network device cannot determine the valid duration configuration of the RTT information adopted by the terminal.

It is to be understood that for reporting contents, the solution of reporting the valid duration may be implemented separately, and may be implemented in combination with the solution of reporting the remaining duration within the valid duration and the solution of reporting the duration that has lasted within the valid duration.

It is to be noted that the example of the disclosure is illustrated merely by taking an example that the terminal sends the timing information to the network device, but in another example, the terminal sends the timing information to a transit device, and then the transit device sends the received timing information to the network device.

It is to be noted that the steps performed by the terminal in the example of the disclosure may be separately implemented to form a new example, and the steps performed by the network device may be separately implemented to form a new example.

An example of the disclosure provides a method for reporting information, and a terminal reports timing information of RTT information to a network device, so as to facilitate the network device in determining a starting moment of a valid duration of the RTT information received by the terminal, and ensuring accuracy of information reported by the terminal. Additionally, the timing information can indicate the valid duration of the RTT information to the network device, so as to facilitate the network device in executing subsequent data transmission based on the timing information, and ensuring reliability of data transmission.

Figure 4:
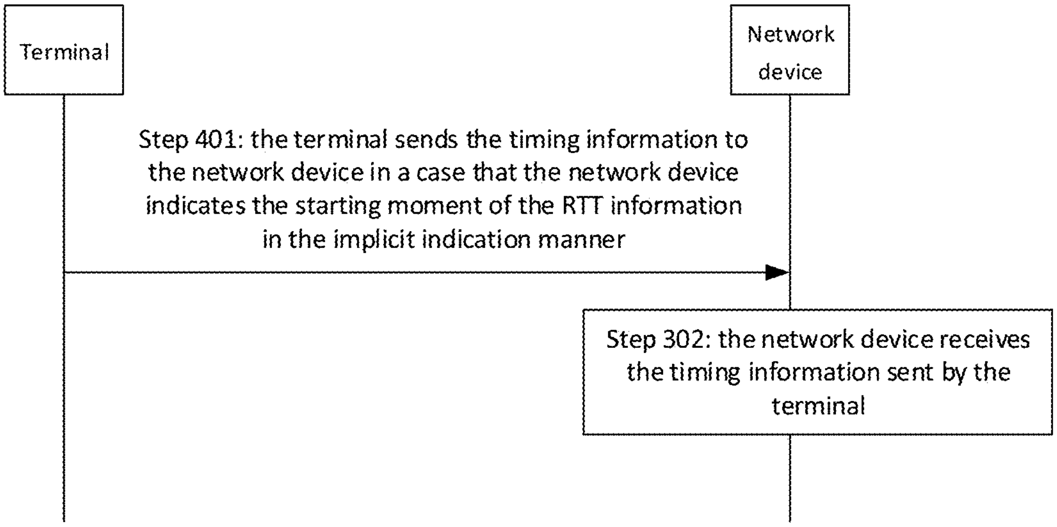
FIG. 4 shows a flow diagram of a method for reporting information provided by an example of the disclosure.

In some examples, based on the example shown in FIG. 3, when the network device may indicate the starting moment of the valid duration in an implicit indication manner, the terminal sends the timing information to the network device. Referring to FIG. 4, the method includes step 401.

Step 401: the terminal sends the timing information to the network device in a case that the network device indicates the starting moment of the RTT information in the implicit indication manner.

In the example of the disclosure, if the network device indicates the starting moment of the valid duration of the RTT information in the implicit indication manner, the terminal determines that the network device cannot accurately obtain the starting moment of the RTT information of the terminal at this moment, and at this moment, the terminal needs to send the timing information to the network device, so that the terminal informs the network device of the starting moment of the RTT information. For example, when the network device does not explicitly provide an epoch time (namely, the starting moment of the valid duration of the RTT information) in a system message, that is, the network device does not provide an SFN and subframe number corresponding to the epoch time, the terminal needs to send the timing information to the network device, so as to inform the network device.

In some examples, the starting moment is represented by adopting the epoch time (validity starting moment), or represented by adopting other manners, which is not limited in the example of the disclosure.

In some examples, the implicit indication manner is to determine an ending moment of a time window for sending the RTT information as the starting moment of the RTT information.

The network device sends the RTT information by means of system information (SI), the SI corresponds to the time window, and the implicit indication manner is to determine the ending moment of the time window corresponding to the SI for sending the RTT information as the starting moment of the valid duration of the RTT information.

In the example of the disclosure, the network device further receives the timing information sent by the terminal, and the timing information received by the network device is sent by the terminal to the network device in a case that the network device indicates the starting moment of the RTT information in the implicit indication manner.

In some examples, the terminal sends the timing information to the network device through a random access procedure.

In the example of the disclosure, the terminal is in a non-connected status, and at this time, the terminal needs to perform random access. At this time, the terminal needs to send the timing information to the network device, and thus the terminal may directly send the timing information to the network device through the random access procedure.

The random access procedure performed by the terminal may include any one of msgA (a random access message), msg3 (a random access message) or msg5 (a random access message), and thus, when sending the msgA, the msg3 or the msg5, the terminal may carry the timing information in the msgA, the msg3 or the msg5.

In some examples, the timing information is carried in a radio resource control (RRC) signaling, or the timing information is carried in a media access control control element (MAC CE) signaling.

In some examples, the timing information is carried in at least one of a connection establishment request, a connection restoration request or a connection reestablishment request in the random access procedure.

If the timing information is carried in the RRC signaling, the timing information is carried in at least one of the connection establishment request, the connection restoration request or the connection reestablishment request in the random access procedure.

In some examples, if the timing information is carried in the MAC CE signaling, a logical channel prioritization (LCP) of the MAC CE signaling carrying the timing information is higher than that of logical channel data, and is lower than that of up link common control channel (UL-CCCH) data or that of the MAC CE signaling carrying a cell-radio network temporary identifier (C-RNTI).

The LCP of the MAC CE signaling carrying the timing information is higher than a priority of a buffer status report (BSR) or lower than a priority of a power headroom report (PHR).

It is to be noted that, when the terminal sends the timing information to the network device through the random access procedure, a random access procedure triggered through an on-demand SI request is not included.

In addition, in the example of the disclosure, the network device may further send, to the terminal, indication information for indicating whether the terminal is allowed to send the timing information through the random access procedure. If the indication information indicates that the terminal is allowed to send the timing information through the random access procedure, the terminal may perform the foregoing procedure of sending the timing information through the random access procedure. However, if the indication information indicates that the terminal is prohibited from sending the timing information through the random access procedure, the terminal cannot execute the foregoing procedure of sending the timing information through the random access procedure.

In some other examples, the terminal may further send the timing information in the following cases.

(1) The terminal sends the timing information to the network device in a case that the timing information is not sent through the random access procedure.

In the example of the disclosure, if the terminal does not send the timing information through the random access procedure, the terminal sends the timing information to the network device after being in a connected status subsequently.

(2) The terminal sends the timing information to the network device in a case that new RTT information configured by the network device is acquired.

In the example of the disclosure, the network device may further re-configure the new RTT information for the terminal, and if the terminal acquires the new RTT information configured by the network device, the terminal needs to send the timing information to the network device.

In some examples, the network device configures the new RTT information for the terminal by broadcast.

(3) The terminal sends the timing information to the network device in a case that the valid duration is reset.

In the example of the disclosure, the valid duration of the RTT information received by the terminal is reset, that is, the terminal re-times the valid duration of the RTT information, and in a case of determining that the valid duration is reset, the terminal sends the timing information to the network device.

It is to be noted that the example of the disclosure is illustrated merely by taking an example of sending the timing information to the terminal in the foregoing three situations. In another example, a specific moment when the terminal sends the timing information is illustrated.

In some examples, the terminal sends the timing information to the network device at any moment within the valid duration.

In the example of the disclosure, after determining in the above manner that the timing information needs to be sent to the network device, the terminal sends the timing information to the network device at any moment within the valid duration of the RTT information.

In some examples, if the valid duration is timed by using a timer, the timing information is sent to the network device at any moment before the timer expires.

In some other examples, the terminal sends the timing information to the network device within a preset duration before the valid duration expires, where the preset duration is less than the valid duration.

In the example of the disclosure, the preset duration is set in the terminal, and the terminal may send the timing information to the network device within the preset duration before the valid duration expires.

In some examples, the terminal sends the timing information to the network device at a preset moment within the preset duration before the valid duration expires.

In some examples, the preset duration is configured by the network device, or configured in other manners.

For example, the network device may configure a threshold, and reporting may be triggered within the threshold before the valid duration expires.

According to the method provided by the example of the disclosure, the terminal reports the timing information of the RTT information to the network device, so as to facilitate the network device in determining the starting moment of the valid duration of the RTT information received by the terminal, and ensuring accuracy of the information reported by the terminal. Additionally, the timing information can indicate the valid duration of the RTT information to the network device, so as to facilitate the network device in executing subsequent data transmission based on the timing information, and ensuring reliability of data transmission.

Figure 5:
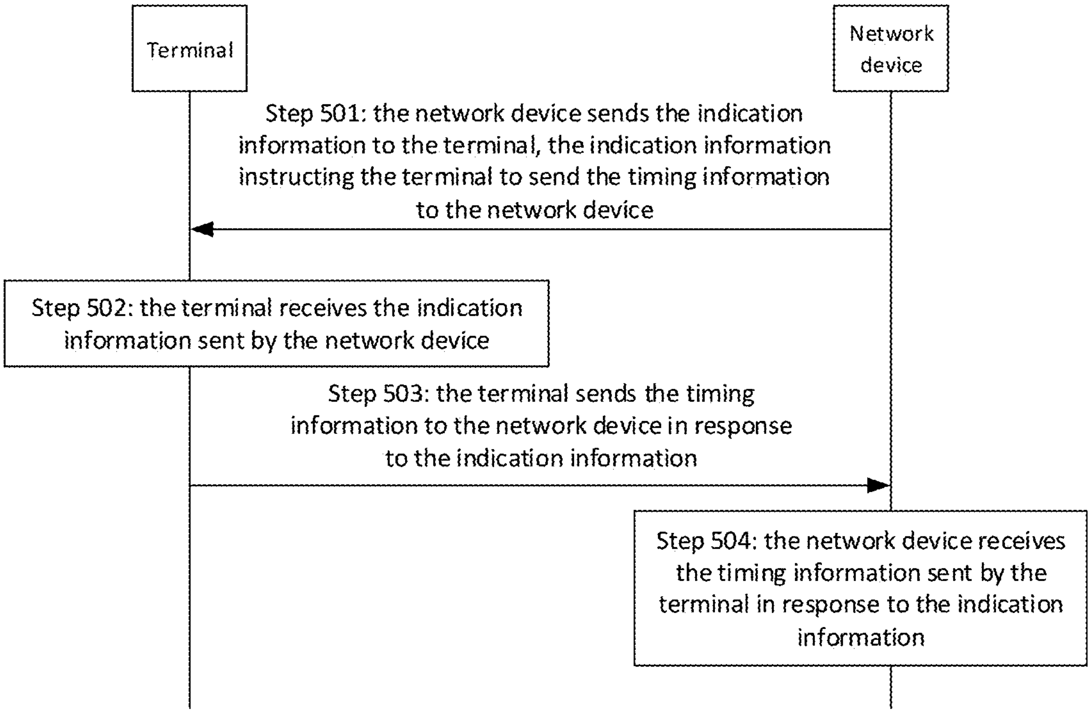
FIG. 5 shows a flow diagram of a method for reporting information provided by an example of the disclosure.

In some examples, based on the example shown in FIG. 3, the network device may instruct the terminal to return the timing information through the indication information. Referring to FIG. 5, the method includes step 501-step 504.

Step 501: the network device sends the indication information to the terminal, the indication information instructing the terminal to send the timing information to the network device.

Step 502: the terminal receives the indication information sent by the network device.

Step 503: the terminal sends the timing information to the network device in response to the indication information.

Step 504: the network device receives the timing information sent by the terminal in response to the indication information.

In the example of the disclosure, the terminal receives the indication information sent by the network device, the indication information instructing the terminal to send the timing information to the network device, the terminal sends the timing information to the network device in response to the indication information, and then the network device receives the timing information sent by the terminal.

In some examples, the indication information is carried in system information. That is, the network device carries the indication information in the system information, and the indication information may be sent to the terminal in a process that the network device broadcasts the system information.

It is to be noted that, in the foregoing example, the terminal sends the timing information to the network device when being in the connected status. If the terminal sends the timing information without an uplink resource, the terminal needs to trigger SR or RACH first, and then sends the timing information after acquiring the uplink resource.

The time when the terminal sends the timing information and the content of the timing information are already described in the aforementioned examples, and are not repeated here.

According to the method provided by the example of the disclosure, the terminal reports the timing information of the RTT information to the network device, so as to facilitate the network device in determining the starting moment of the valid duration of the RTT information received by the terminal, and ensuring accuracy of the information reported by the terminal. Additionally, the timing information can indicate the valid duration of the RTT information to the network device, so as to facilitate the network device in executing subsequent data transmission based on the timing information, and ensuring reliability of data transmission.

Figure 6:
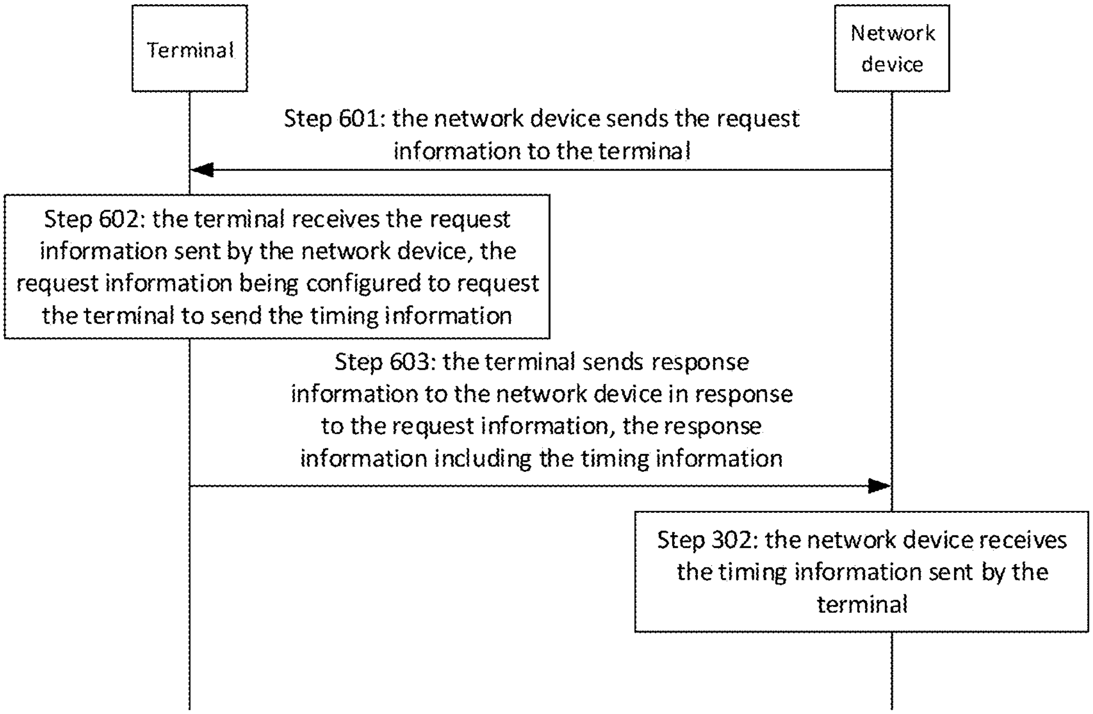
FIG. 6 shows a flow diagram of a method for reporting information provided by an example of the disclosure.

In some examples, the terminal may send the timing information according to request information sent by the network device. Referring to FIG. 6, the method includes step 601-step 603.

Step 601: the network device sends the request information to the terminal.

Step 602: the terminal receives the request information sent by the network device, the request information being configured to request the terminal to send the timing information.

In the example of the disclosure, if the network device needs to acquire the timing information of the terminal, the network device sends the request information to the terminal, and after receiving the request information, the terminal determines that the network device needs to acquire the timing information.

In some examples, the request information is carried in a terminal dedicated signaling.

Step 603: the terminal sends response information to the network device in response to the request information, the response information including the timing information.

In the example of the disclosure, after receiving the request information, the terminal sends the response information including the timing information to the network device in response to the request information, which may also be understood as follows: after receiving the request information sent by the network device, the terminal returns the timing information to the network device by means of feedback information of the request information.

In some examples, the request information is RRC information, MAC CE information or PDCCH information. Correspondingly, the response information returned by the terminal is RRC information or MAC CE information.

It is to be noted that the example of the disclosure is illustrated merely by taking an example that the network device sends the request information to the terminal. In another example, the network device may further determine whether to send the request information based on capability information sent by the terminal.

In the example of the disclosure, the terminal sends the capability information to the network device, the capability information indicating whether the terminal supports sending the timing information; and the network device receives the capability information sent by the terminal, and sends the request information based on the capability information.

If the capability information returned by the terminal indicates that the terminal does not support sending the timing information, the network device does not execute step 601 above and the terminal does not execute the subsequent steps. If the capability information returned by the terminal indicates that the terminal supports sending the timing information, the network device may execute step 601, and the terminal may also execute the subsequent steps 602-603.

The content of the timing information has already been described in the aforementioned examples, and is not repeated here.

According to the method provided by the example of the disclosure, the terminal informs, by means of the capability information, the network device whether the terminal supports sending the timing information, so that the network device may determine whether to actively request to acquire the timing information of the terminal, thus improving communication efficiency.

Figure 7:
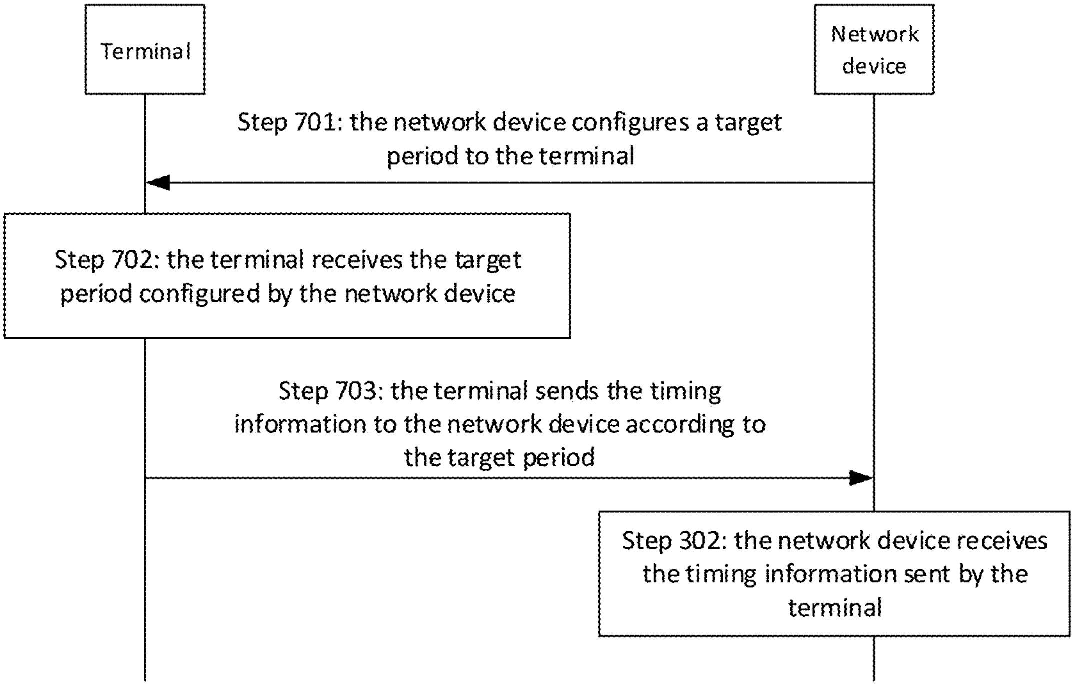
FIG. 7 shows a flow diagram of a method for reporting information provided by an example of the disclosure.

Based on the example shown in FIG. 3, the terminal may further periodically send the timing information. Referring to FIG. 7, the method includes step 701-step 703.

Step 701: the network device configures a target period to the terminal.

Step 702: the terminal receives the target period configured by the network device.

Step 703: the terminal sends the timing information to the network device according to the target period.

In the example of the disclosure, the network device may configure the target period for the terminal; after receiving the target period, the terminal may determine that the timing information needs to be periodically sent to the network device; and thus, the terminal periodically sends the timing information to the network device according to the target period.

The target period is 10 milliseconds (ms), 20 ms, or other numeric values.

It is to be noted that the example of the disclosure is merely illustrated by taking an example that the network device configures the target period for the terminal. Steps 701-702 above are optional steps. In another example, steps 701-702 may not be performed, and the terminal directly sends the timing information to the network device according to the target period.

In the example of the disclosure, the target period may be appointed by a communication protocol, or determined by the terminal, which is not limited in the example of the disclosure.

The content of the timing information has already been described in the aforementioned examples, and is not repeated here.

Figure 8:
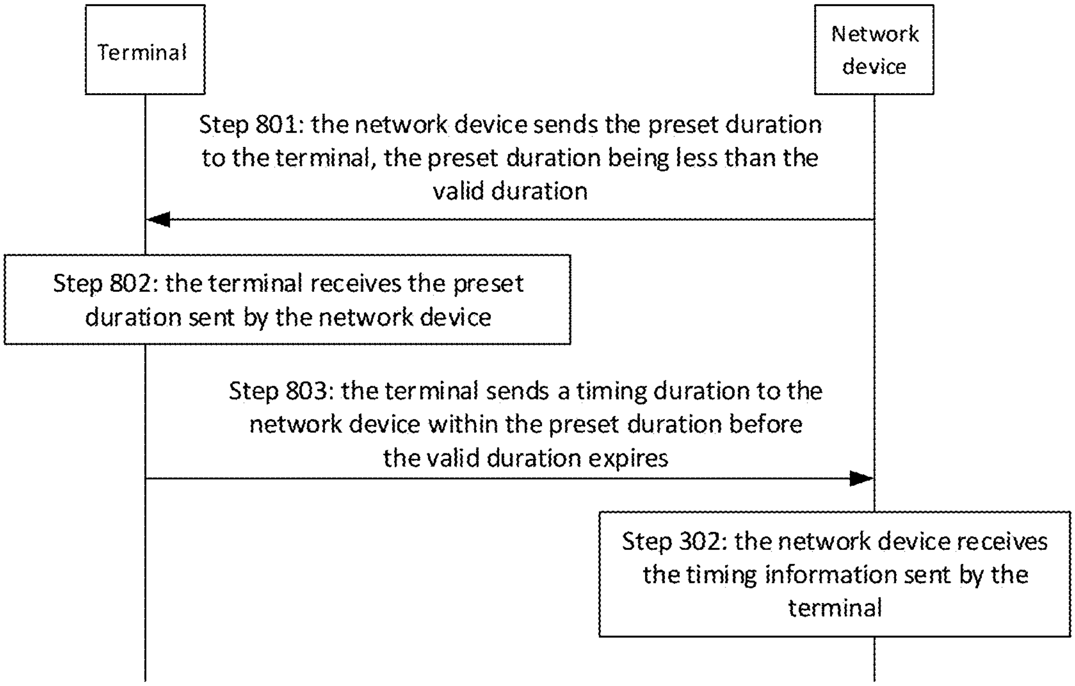
FIG. 8 shows a flow diagram of a method for reporting information provided by an example of the disclosure.

Based on the example shown in FIG. 3, the terminal sends the timing information within the preset duration of the valid duration. Referring to FIG. 8, the method includes step 801-step 803.

Step 801: the network device sends the preset duration to the terminal, the preset duration being less than the valid duration.

Step 802: the terminal receives the preset duration sent by the network device.

Step 803: the terminal sends a timing duration to the network device within the preset duration before the valid duration expires.

In the example of the disclosure, the network device configures the preset duration for the terminal, and instructs the terminal, through the preset duration, to send the timing information within the preset duration before the valid duration expires. Thus, after receiving the preset duration sent by the network device, the terminal sends the timing duration to the network device within the preset duration before the valid duration expires. It may also be understood that the network device configures a trigger event for the terminal by means of the preset duration, if the terminal determines to reach the preset duration before the valid duration expires, event triggering is determined, and the timing information needs to be sent to the network device.

It is to be noted that the example of the disclosure is merely illustrated by taking an example that the network device configures the preset duration for the terminal. Steps 801-802 above are optional steps. In another example, steps 801-802 may not be performed, and the terminal directly sends the timing information to the network device according to the preset duration.

In the example of the disclosure, a target period may be appointed by a communication protocol, or determined by the terminal, which is not limited in the example of the disclosure.

The content of the timing information has already been described in the aforementioned examples, and is not repeated here.

Figure 9:
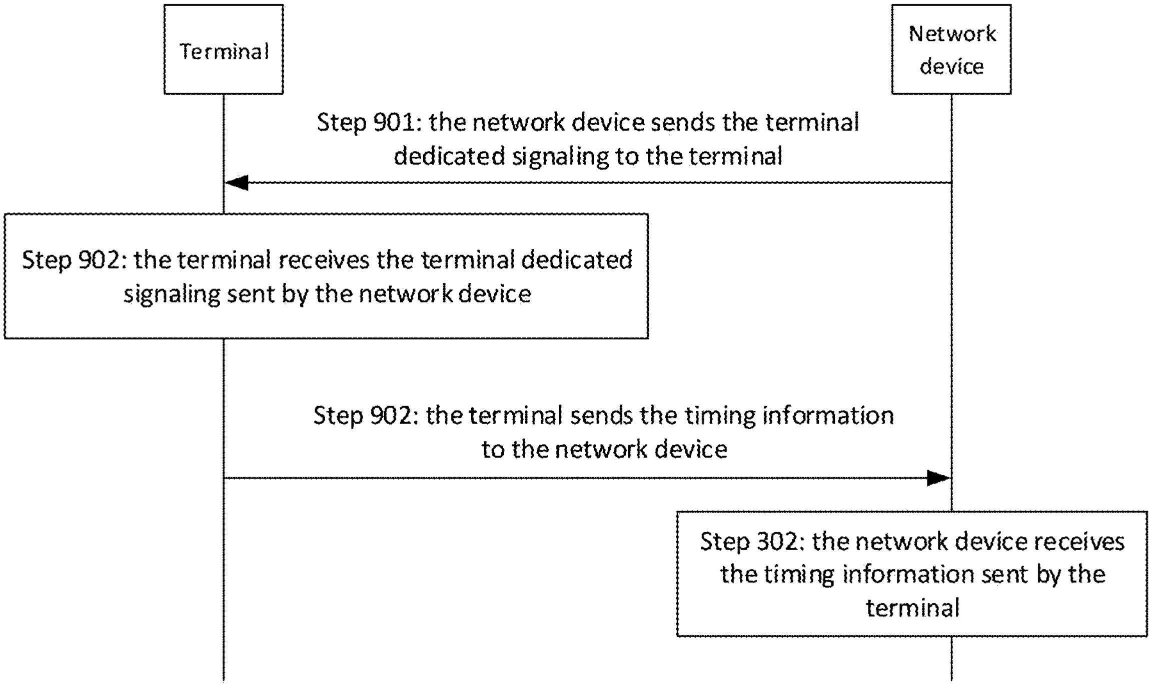
FIG. 9 shows a flow diagram of a method for reporting information provided by an example of the disclosure.

Based on the example shown in FIG. 3, the terminal sends the timing information through a terminal dedicated signaling configured by the network device. Referring to FIG. 9, the method includes step 901-step 902.

Step 901: the network device sends the terminal dedicated signaling to the terminal.

Step 902: the terminal receives the terminal dedicated signaling sent by the network device, and sends the timing information to the network device.

In the example of the disclosure, the network device sends the terminal dedicated signaling to the terminal, and instructs the terminal, through the terminal dedicated signaling, to send the timing information to the network device. Thus, after receiving the terminal dedicated signaling, the terminal determines that the timing information needs to be sent to the network device.

In some examples, the terminal sends the timing information through a UE assistance information message.

In some examples, the terminal receives the terminal dedicated signaling sent by the network device, and sends the timing information in the following cases.

(1) The timing information is sent to the network device in a case that the timing information is not sent through a random access procedure.

(2) The timing information is sent to the network device in a case that new RTT information configured by the network device is acquired.

(3) The timing information is sent to the network device in a case that the valid duration is reset.

In some examples, the terminal sends the timing information to the network device at any moment within the valid duration.

In some other examples, the terminal sends the timing information to the network device within the preset duration before the valid duration expires.

The steps performed in the example of the disclosure are similar to the steps performed in the example shown in FIG. 4, and are not repeated here.

It is to be noted that the example of the disclosure is illustrated merely by taking an example that the network device sends the terminal dedicated signaling to the terminal. In another example, the network device may determine whether to send the terminal dedicated signaling based on capability information sent by the terminal.

In the example of the disclosure, the terminal sends the capability information to the network device, the capability information indicating whether the terminal supports sending the timing information; and the network device receives the capability information sent by the terminal, and sends the terminal dedicated signaling based on the capability information.

If the capability information returned by the terminal indicates that the terminal does not support sending the timing information, the network device does not execute step 901 above and the terminal does not execute the subsequent steps performed by the terminal. If the capability information returned by the terminal indicates that the terminal supports sending the timing information, the network device may execute step 901, and the terminal may also execute the subsequent steps 902-903.

The content of the timing information has already been described in the aforementioned examples, and is not repeated here.

According to the method provided by the example of the disclosure, the terminal informs, by means of the capability information, the network device whether the terminal supports sending the timing information, so that the network device may determine whether to actively request to acquire the timing information of the terminal, thus improving communication efficiency.

Based on the example shown in FIG. 3, the terminal may further directly send the timing information to the network device, which includes any one of the following cases.

In some examples, the terminal sends the timing information to the network device in the case that the new RTT information configured by the network device is acquired.

In the example of the disclosure, in the case that the terminal acquires the new RTT information configured by the network device, the terminal determines that the timing information needs to be sent to the network device, and the network device may receive the timing information sent by the terminal.

In some other examples, the terminal sends the timing information to the network device in the case that the valid duration is reset.

In the example of the disclosure, the valid duration of the RTT information received by the terminal is reset, that is, the terminal re-times the valid duration of the RTT information, and in a case of determining that the valid duration is reset, the terminal sends the timing information to the network device.

As mentioned above, the terminal may send the timing information to the network device. In addition, the terminal may further cancel reporting of the timing information to the network device, that is, the terminal may cancel sending of the timing information, which specifically includes any one of the following cases.

(1) Sending of the timing information to the network device is canceled in a case that the RTT information is acquired through the terminal dedicated signaling.

In the example of the disclosure, after acquiring the RTT information through the terminal dedicated signaling, the terminal may further determine the starting moment of the valid duration of the RTT information according to the terminal dedicated signaling. Since the terminal dedicated signaling is sent by the network device, the network device also learns the starting moment of the valid duration of the RTT information, and thus, the terminal does not need to send the timing information, and cancels sending of the timing information to the network device.

(2) The timing information is not sent to the network device after the RTT information is acquired through the terminal dedicated signaling.

In the example of the disclosure, after acquiring the RTT information through the terminal dedicated signaling, the terminal may further determine the starting moment of the valid duration of the RTT information according to the terminal dedicated signaling. Since the terminal dedicated signaling is sent by the network device, the network device also learns the starting moment of the valid duration of the RTT information, and thus, the terminal does not send the timing information to the network device subsequently.

(3) The timing information is not sent to the network device after the RTT information is acquired through the terminal dedicated signaling and before the new RTT information configured by the network device is acquired.

In the example of the disclosure, after acquiring the RTT information through the terminal dedicated signaling, the terminal may further determine the starting moment of the valid duration of the RTT information according to the terminal dedicated signaling. Since the terminal dedicated signaling is sent by the network device, the network device also learns the starting moment of the valid duration of the RTT information, and thus, the timing information is not sent to the network device after the RTT information is acquired through the terminal dedicated signaling and before the new RTT information configured by the network device is acquired.

(4) Sending of the timing information to the network device is canceled in a case that a canceling instruction sent by the network device is received.

In the example of the disclosure, the network device may further send the canceling instruction to the terminal to inform the terminal to cancel sending of the timing information, and thus, the terminal cancels sending of the timing information to the network device in the case of receiving the canceling instruction.

(5) Sending of the timing information to the network device is canceled in a case that the RTT information is acquired in an on-demand manner.

In the example of the disclosure, the terminal may request to acquire the RTT information configured by the network device in the on-demand manner. In this case, the network device may determine the starting moment of the valid duration of the RTT information of the terminal, and thus, the terminal does not need to send the timing information to the network device, and cancels the determined sending of the timing information to the network device.

According to the method provided by the example of the disclosure, the terminal may cancel sending of the timing information to the network device, so as to ensure that the terminal does not send the timing information in a case of not sending the timing information to the network device, thus saving signaling overheads and improving transmission efficiency.

It is to be noted that the above examples may be split into new examples, or combined with other examples into the new examples. The disclosure does not limit combinations of the examples.

Figure 10:
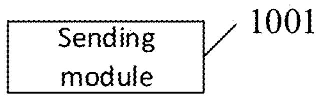
FIG. 10 shows a block diagram of an apparatus for reporting information provided by an example of the disclosure.

FIG. 10 shows a block diagram of an apparatus for reporting information provided by an example of the disclosure. Referring to FIG. 10, the apparatus includes:

a sending module 1001, configured to send timing information to a network device, the timing information indicating a valid duration of RTT information, and the RTT information indicating a duration from a terminal to the network device via a transit device.

In some examples, the RTT information includes first information and second information; and the first information indicates an RTT from the transit device to the network device, and the second information indicates an RTT from the terminal to the transit device.

In some examples, the sending module 1001 is further configured to send the timing information to the network device in a case that the network device indicates a starting moment of the RTT information in an implicit indication manner.

In some examples, the implicit indication manner is to determine an ending moment of a time window for sending the RTT information as the starting moment of the RTT information.

Figure 11:
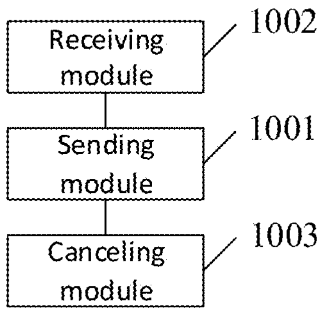
FIG. 11 shows a block diagram of an apparatus for reporting information provided by an example of the disclosure.

In some examples, referring to FIG. 11, the apparatus further includes:

a receiving module 1002, configured to receive indication information sent by the network device, the indication information instructing the terminal to send the timing information to the network device; and the sending module 1001, further configured to send the timing information to the network device in response to the indication information.

In some examples, the sending module 1001 is further configured to send the timing information to the network device through a random access procedure.

In some examples, the timing information is carried in at least one of a connection establishment request, a connection restoration request or a connection reestablishment request in the random access procedure.

In some examples, the sending module 1001 is further configured to perform at least one of:

sending the timing information to the network device in a case that the timing information is not sent through the random access procedure;

sending the timing information to the network device in a case that new RTT information configured by the network device is acquired; or sending the timing information to the network device in a case that the valid duration is reset.

In some examples, the sending module 1001 is further configured to perform at least one of:

sending the timing information to the network device at any moment within the valid duration; or sending the timing information to the network device within a preset duration before the valid duration expires.

In some examples, the timing information is carried in an RRC signaling, or the timing information is carried in an MAC CE signaling.

In some examples, referring to FIG. 11, the apparatus further includes:

the receiving module 1002, configured to receive request information sent by the network device, the request information being configured to request the terminal to send the timing information; and the sending module 1001, further configured to send response information to the network device in response to the request information, the response information including the timing information.

In some examples, the request information is RRC information, MAC CE information or physical downlink control channel (PDCCH) information; and the response information is RRC information or MAC CE information.

In some examples, the sending module 1001 is further configured to:

send capability information to the network device, the capability information indicating whether the terminal supports sending the timing information; and the network device is configured to send the request information based on the capability information.

In some examples, the sending module 1001 is further configured to send the timing information to the network device according to a target period.

In some examples, referring to FIG. 11, the apparatus further includes:

the receiving module 1002, configured to receive the target period configured by the network device.

In some examples, the sending module 1001 is further configured to send the timing information to the network device within a preset duration before the valid duration expires, where the preset duration is less than the valid duration.

In some examples, referring to FIG. 11, the apparatus further includes:

the receiving module 1002, configured to receive the preset duration sent by the network device.

In some examples, the sending module 1001 is further configured to send the timing information to the network device in a case that a terminal dedicated signaling sent by the network device is received.

In some examples, the sending module 1001 is further configured to perform at least one of:

sending the timing information to the network device in a case that the timing information is not sent through a random access procedure;

sending the timing information to the network device in a case that new RTT information configured by the network device is acquired; or sending the timing information to the network device in a case that the valid duration is reset.

In some examples, the sending module 1001 is further configured to perform at least one of:

sending the timing information to the network device at any moment within the valid duration; or sending the timing information to the network device within a preset duration before the valid duration expires.

In some examples, the sending module 1001 is further configured to send capability information to the network device, the capability information indicating whether the terminal supports sending the timing information; and the network device is configured to send the terminal dedicated signaling based on the capability information.

In some examples, the sending module 1001 is further configured to perform at least one of:

sending the timing information to the network device in a case that new RTT information configured by the network device is acquired; or sending the timing information to the network device in a case that the valid duration is reset.

In some examples, the apparatus further includes:

a canceling module 1003, configured to perform at least one of:

canceling sending of the timing information to the network device in a case that the RTT information is acquired through the terminal dedicated signaling;

not sending the timing information to the network device after the RTT information is acquired through the terminal dedicated signaling;

not sending the timing information to the network device after the RTT information is acquired through the terminal dedicated signaling and before new RTT information configured by the network device is acquired;

canceling sending of the timing information to the network device in a case that a canceling instruction sent by the network device is received; or canceling sending of the timing information to the network device in a case that the RTT information is acquired in an on-demand manner.

In some examples, the timing information includes at least one of:

a remaining duration within the valid duration;

a duration that has lasted within the valid duration; or the valid duration.

It is to be noted that when the apparatus provided by the above examples realizes its functions, merely the division of all the above functional modules is used as an example for illustration. In practical application, the above functions may be allocated to be completed by the different functional modules according to needs. That is, an internal structure of the device is divided into the different functional modules to complete all or part of the functions described above. In addition, the apparatus provided by the above examples belongs to the same concept with the method examples, and its specific implementation process is detailed in the method examples, which will not be repeated here.

Figure 12:
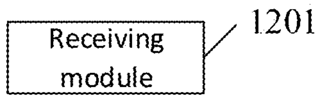
FIG. 12 shows a block diagram of an apparatus for reporting information provided by an example of the disclosure.

FIG. 12 shows a block diagram of an apparatus for reporting information provided by an example of the disclosure. Referring to FIG. 12, the apparatus includes:

a receiving module 1201, configured to receive timing information sent by a terminal, the timing information indicating a valid duration of RTT information, and the RTT information indicating a duration from the terminal to a network device via a transit device.

In some examples, the RTT information includes first information and second information; and the first information indicates an RTT from the transit device to the network device, and the second information indicates an RTT from the terminal to the transit device.

In some examples, the timing information is sent by the terminal to the network device in a case that the network device indicates a starting moment of the RTT information in an implicit indication manner.

In some examples, the implicit indication manner is to determine an ending moment of a time window for sending the RTT information as the starting moment of the RTT information.

Figure 13:
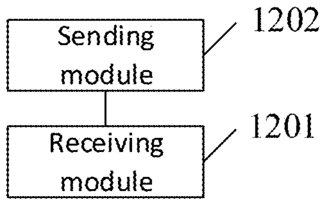
FIG. 13 shows a block diagram of an apparatus for reporting information provided by an example of the disclosure.

In some examples, referring to FIG. 13, the apparatus further includes:

a sending module 1202, configured to send indication information to the terminal, the indication information instructing the terminal to send the timing information to the network device; and the receiving module 1201, further configured to receive the timing information sent by the terminal in response to the indication information.

In some examples, the receiving module 1201 is further configured to receive the timing information sent by the terminal through a random access procedure.

In some examples, the timing information is carried in at least one of a connection establishment request, a connection restoration request or a connection reestablishment request in the random access procedure.

In some examples, the timing information is sent by the terminal to the network device in a case that the timing information is not sent through the random access procedure;

or, the timing information is sent by the terminal to the network device in a case that new RTT information configured by the network device is acquired;

or, the timing information is sent by the terminal to the network device in a case that the valid duration is reset.

In some examples, the timing information is sent by the terminal to the network device at any moment within the valid duration;

or, the timing information is sent by the terminal to the network device within a preset duration before the valid duration expires.

In some examples, the timing information is carried in a radio resource control (RRC) signaling, or the timing information is carried in a media access control control element (MAC CE) signaling.

In some examples, referring to FIG. 13, the apparatus further includes:

the sending module 1202, configured to send request information to the terminal, the request information being configured to request the terminal to send the timing information; and the receiving module 1201, further configured to receive response information sent by the terminal in response to the request information, the response information including the timing information.

In some examples, the request information is RRC information, MAC CE information or PDCCH information; and the response information is RRC information or MAC CE information.

In some examples, the receiving module 1201 is further configured to receive capability information sent by the terminal, the capability information indicating whether the terminal supports sending the timing information; and the request information is sent based on the capability information.

In some examples, the receiving module 1201 is further configured to receive the timing information sent by the terminal according to a target period.

In some examples, referring to FIG. 13, the apparatus further includes:

the sending module 1202, configured to configure the target period to the terminal.

In some examples, the timing information is sent by the terminal to the network device within a preset duration before the valid duration expires, where the preset duration is less than the valid duration.

In some examples, the apparatus further includes:

the sending module 1202, configured to send the preset duration to the terminal.

In some examples, referring to FIG. 13, the apparatus further includes:

the sending module 1202, configured to send a terminal dedicated signaling to the terminal; and the receiving module 1201, further configured to receive the timing information sent by the terminal in a case that the terminal dedicated signaling sent by the network device is received.

In some examples, the timing information is sent by the terminal to the network device in a case that the timing information is not sent through a random access procedure;

or, the timing information is sent by the terminal to the network device in a case that new RTT information configured by the network device is acquired;

or, the timing information is sent by the terminal to the network device in a case that the valid duration is reset.

In some examples, the timing information is sent by the terminal to the network device at any moment within the valid duration;

or, the timing information is sent by the terminal to the network device within a preset duration before the valid duration expires.

In some examples, the receiving module 1201 is further configured to receive capability information sent by the terminal, the capability information indicating whether the terminal supports sending the timing information; and the sending module 1202 is configured to send the terminal dedicated signaling based on the capability information.

In some examples, the timing information is sent by the terminal to the network device in a case that new RTT information configured by the network device is acquired;

or, the timing information is sent by the terminal to the network device in a case that the valid duration is reset.

In some examples, the timing information includes at least one of:

a remaining duration within the valid duration;

a duration that has lasted within the valid duration; or the valid duration.

It is to be noted that when the apparatus provided by the above examples realizes its functions, merely the division of all the above functional modules is used as an example for illustration. In practical application, the above functions may be allocated to be completed by the different functional modules according to needs. That is, an internal structure of the device is divided into the different functional modules to complete all or part of the functions described above. In addition, the apparatus provided by the above examples belongs to the same concept with the method examples, and its specific implementation process is detailed in the method examples, which will not be repeated here.

Figure 14:
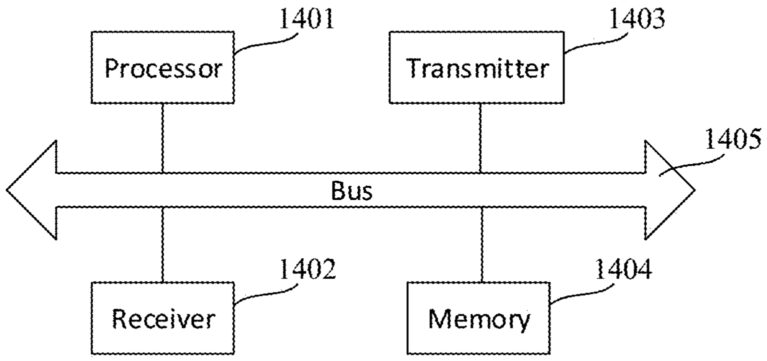
FIG. 14 shows a schematic structural diagram of a communication device provided by an example of the disclosure.

FIG. 14 shows a schematic structural diagram of a communication device provided by an example of the disclosure. The communication device includes: a processor 1401, a receiver 1402, a transmitter 1403, a memory 1404, and a bus 1405.

The processor 1401 includes one or more processing cores, and the processor 1401 executes various functional applications and information processing by running software programs and modules.

The receiver 1402 and the transmitter 1403 may be implemented as a communication component, which may be a communication chip.

The memory 1404 is connected with the processor 1401 through the bus 1405.

The memory 1404 may be configured to store at least one program code, and the processor 1401 is configured to execute the at least one program code, so as to implement various steps in the above method examples.

In addition, the communication device may be a terminal or a network device. The memory 1404 may be implemented by any type of volatile or nonvolatile storage devices or their combinations, and the volatile or nonvolatile storage devices include, but are not limited to: a magnetic disk or an optical disk, an electrically erasable programmable read only memory (EEPROM), an erasable programmable read only memory (EPROM), a static random access memory (SRAM), a read only memory (ROM), a magnetic memory, a flash memory, and a programmable read only memory (PROM).

In an example, a non-transitory computer readable storage medium is further provided. The readable storage medium stores executable program codes. The executable program codes are loaded and executed by a processor so as to implement the method for reporting information performed by the communication device and provided by each of the foregoing method examples.

In an example, a chip is provided. The chip includes a programmable logic circuit and/or program instructions, and the chip, when running on a terminal or a network device, is configured to implement the method for reporting information provided by each of the method examples.

In an example, a computer program product is provided. The computer program product, when executed by a processor of a terminal or a network device, is used to implement the method for reporting information provided by each of the foregoing method examples.

Those ordinarily skilled in the art can understand that all or part of the steps of the above examples may be implemented by hardware, or may be implemented by instructing relevant hardware through programs. The programs may be stored in a computer readable storage medium. The storage medium mentioned above may be a read only memory, a disk or an optical disk and the like.

The above is merely an optional example of the disclosure and is not intended to limit the disclosure. Any modification, equivalent substitution, improvement and the like made within the spirit and principle of the disclosure shall all be contained in the protection scope of the disclosure.

The invention claimed is:

1. A method for reporting information, performed by a terminal, and comprising:

receiving system information carrying round trip time (RTT) information sent from a network device, wherein the system information further comprises a valid duration of the RTT information;

determining an ending moment of a time window for receiving the system information carrying the RTT information as a starting moment of the valid duration of the RTT information; and sending timing information to the network device, wherein the timing information indicates at least one of a remaining duration or a duration that has lasted within the valid duration of the RTT information, the RTT information is valid within the valid duration, the RTT information indicates a RTT from the terminal to the network device via a transit device;

wherein sending the timing information to the network device comprises:

sending the timing information to the network device in a case that the network device indicates the starting moment of the valid duration of the RTT information in an implicit indication manner, wherein the implicit indication manner is to determine the ending moment of the time window for sending the system information carrying the RTT information as the starting moment of the valid duration of the RTT information.

2. The method according to claim 1, wherein the RTT information comprises first information and second information; and the first information indicates an RTT from the transit device to the network device, and the second information indicates an RTT from the terminal to the transit device.

3. The method according to claim 1, wherein sending the timing information to the network device further comprises at least one of the following:

receiving indication information sent by the network device, the indication information instructing the terminal to send the timing information to the network device; and sending the timing information to the network device in response to the indication information;

sending the timing information to the network device through a random access procedure, wherein the timing information is carried in at least one of a connection establishment request, a connection restoration request or a connection reestablishment request in the random access procedure;

sending the timing information to the network device in a case that the timing information is not sent through a random access procedure;

sending the timing information to the network device in a case that new RTT information configured by the network device is acquired;

sending the timing information to the network device in a case that the valid duration is reset;

receiving request information sent by the network device, the request information being configured to request the terminal to send the timing information; and sending response information to the network device in response to the request information, the response information comprising the timing information;

sending the timing information to the network device according to a target period;

sending the timing information to the network device within a preset duration before the valid duration expires, wherein the preset duration is less than the valid duration; or sending the timing information to the network device in a case that a terminal dedicated signaling sent by the network device is received.

4. The method according to claim 3, wherein sending the timing information to the network device further comprises: receiving request information sent by the network device, the request information being configured to request the terminal to send the timing information; and sending response information to the network device in response to the request information, the response information comprising the timing information;

wherein the method further comprises:

sending capability information to the network device, the capability information indicating whether the terminal supports sending the timing information; and the network device being configured to send the request information based on the capability information.

5. The method according to claim 3, wherein sending the timing information to the network device further comprises: sending the timing information to the network device according to a target period;

wherein the method further comprises:

receiving the target period configured by the network device.

6. The method according to claim 3, wherein sending the timing information to the network device further comprises: sending the timing information to the network device within a preset duration before the valid duration expires, wherein the preset duration is less than the valid duration;

wherein the method further comprises:

receiving the preset duration sent by the network device.

7. The method according to claim 3, wherein sending the timing information to the network device further comprises: sending the timing information to the network device in a case that a terminal dedicated signaling sent by the network device is received;

wherein the method further comprises:

sending capability information to the network device, the capability information indicating whether the terminal supports sending the timing information; and the network device being configured to send the terminal dedicated signaling based on the capability information.

8. The method according to claim 1, further comprising at least one of the following:

canceling sending of the timing information to the network device in a case that the RTT information is acquired through a terminal dedicated signaling;

not sending the timing information to the network device after the RTT information is acquired through the terminal dedicated signaling;

not sending the timing information to the network device after the RTT information is acquired through the terminal dedicated signaling and before new RTT information configured by the network device is acquired;

canceling sending of the timing information to the network device in a case that a canceling instruction sent by the network device is received; or canceling sending of the timing information to the network device in a case that the RTT information is acquired in an on-demand manner.

9. A non-transitory computer readable storage medium, wherein the computer readable storage medium stores executable program codes, and the executable program codes are loaded and executed by a processor to implement the method for reporting information according to claim 1.

10. The method according to claim 1, wherein the remaining duration within the valid duration is a value after flooring.

11. A method for reporting information, performed by a network device, and comprising:

sending system information carrying round trip time (RTT) information to a terminal, wherein the system information further comprises a valid duration of the RTT information, wherein the terminal determines an ending moment of a time window for receiving the system information carrying the RTT information as a starting moment of the valid duration of the RTT information;

receiving timing information sent by the terminal, wherein the timing information indicates at least one of a remaining duration or a duration that has lasted within a valid duration of RTT information, the RTT information is valid within the valid duration, the RTT information indicates a RTT from the terminal to the network device via a transit device;

wherein the network device indicates the starting moment of the valid duration of the RTT information in an implicit indication manner, and the implicit indication manner is to determine the ending moment of the time window for sending the system information carrying the RTT information as the starting moment of the valid duration of the RTT information.

12. The method according to claim 11, wherein receiving the timing information sent by the terminal comprises at least one of the following:

sending indication information to the terminal, the indication information instructing the terminal to send the timing information to the network device; and receiving the timing information sent by the terminal in response to the indication information;

receiving the timing information sent by the terminal through a random access procedure, wherein the timing information is carried in at least one of a connection establishment request, a connection restoration request or a connection reestablishment request in the random access procedure;

sending request information to the terminal, the request information being configured to request the terminal to send the timing information; and receiving response information sent by the terminal in response to the request information, the response information comprising the timing information;

receiving the timing information sent by the terminal according to a target period; or sending a terminal dedicated signaling to the terminal; and receiving the timing information sent by the terminal in a case that the terminal dedicated signaling sent by the network device is received.

13. The method according to claim 12, wherein receiving the timing information sent by the terminal comprises: sending request information to the terminal, the request information being configured to request the terminal to send the timing information; and receiving response information sent by the terminal in response to the request information, the response information comprising the timing information;

wherein the method further comprises:

receiving capability information sent by the terminal, the capability information indicating whether the terminal supports sending the timing information; and sending the request information based on the capability information.

14. The method according to claim 12, wherein receiving the timing information sent by the terminal comprises: receiving the timing information sent by the terminal according to a target period;

wherein the method further comprises configuring the target period to the terminal.

15. The method according to claim 12, wherein receiving the timing information sent by the terminal comprises: sending a terminal dedicated signaling to the terminal; and receiving the timing information sent by the terminal in a case that the terminal dedicated signaling sent by the network device is received;

wherein the method further comprises:

receiving capability information sent by the terminal, the capability information indicating whether the terminal supports sending the timing information; and sending the terminal dedicated signaling based on the capability information.

16. The method according to claim 11, wherein the timing information is sent by the terminal to the network device within a preset duration before the valid duration expires, wherein the preset duration is less than the valid duration;

the method further comprising:

sending the preset duration to the terminal.

17. A network device, comprising:

a processor; and a transceiver, connected with the processor, wherein the processor is configured to load and execute executable instructions so as to implement the method for reporting information according to claim 11.

18. A non-transitory computer-readable storage medium storing computer program instructions, wherein the program instructions, when collectively executed by one or more processors, cause the one or more processors to perform the method for reporting information according to claim 11.

19. The method according to claim 11, wherein the remaining duration within the valid duration is a value after flooring.

20. A terminal, comprising:

a processor; and a transceiver, connected with the processor, wherein the processor is configured to load and execute executable instructions to:

receive system information carrying round trip time (RTT) information sent from a network device, wherein the system information further comprises a valid duration of the RTT information;

determine an ending moment of a time window for receiving the system information carrying the RTT information as a starting moment of the valid duration of the RTT information; and send timing information to the network device, wherein the timing information indicates at least one of a remaining duration or a duration that has lasted within a valid duration of round trip time (RTT) information, the RTT information is valid within the valid duration, the RTT information indicates a RTT from the terminal to the network device via a transit device;

wherein the processor is further configured to:

send the timing information to the network device in a case that the network device indicates the starting moment of the valid duration of the RTT information in an implicit indication manner, wherein the implicit indication manner is to determine the ending moment of the time window for sending the system information carrying the RTT information as the starting moment of the valid duration of the RTT information.

* * * * *